US009304769B2

(12) United States Patent
Saha et al.

(10) Patent No.: US 9,304,769 B2
(45) Date of Patent: *Apr. 5, 2016

(54) HANDLING PRECOMPILED BINARIES IN A HARDWARE ACCELERATED SOFTWARE TRANSACTIONAL MEMORY SYSTEM

(71) Applicant: Intel Corporation, Santa Clara, CA (US)

(72) Inventors: Bratin Saha, Santa Clara, CA (US); Ali-Reza Adl-Tabatabai, San Jose, CA (US); Quinn A. Jacobson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,024

(22) Filed: May 6, 2014

(65) Prior Publication Data

US 2015/0040111 A1 Feb. 5, 2015

Related U.S. Application Data

(63) Continuation of application No. 11/648,008, filed on Dec. 28, 2006, now Pat. No. 8,719,807.

(51) Int. Cl.
*G06F 9/45* (2006.01)
*G06F 13/00* (2006.01)
(Continued)

(52) U.S. Cl.
CPC .......... *G06F 9/30087* (2013.01); *G06F 9/3004* (2013.01); *G06F 9/30043* (2013.01); *G06F 9/30076* (2013.01); *G06F 9/3834* (2013.01); *G06F 9/3851* (2013.01);

(Continued)

(58) Field of Classification Search
None
See application file for complete search history.

(56) References Cited

U.S. PATENT DOCUMENTS 5,210,838 A 5/1993 Jensen
5,418,927 A 5/1995 Chang
(Continued)

OTHER PUBLICATIONS

Ananian, C.S.; Asanovic, K.; Kuszmaul, B.C.; Leiserson, C.E.; Lie, S.; "Unbounded transactional memory," 11th International Symposium on High-Performance Computer Architecture, 2005, HPCA-11, Feb. 12-16, 2005, pp. 316-327.
(Continued)

*Primary Examiner* — Tuan Q. Dam
*Assistant Examiner* — Zheng Wei
(74) *Attorney, Agent, or Firm* — Barnes & Thornburg LLP

(57) ABSTRACT

A method and apparatus for enabling a Software Transactional Memory (STM) with precompiled binaries is herein described. Upon encountering an access operation in a transaction, an annotation field associated with a memory location referenced by the access is checked. In response to the memory location representing a previous similar access within the transaction, the access is performed without access barriers. However, if the annotation field is in a default state representing no previous access during a pendancy of the transaction, then a mode of the processor is determined. If the processor mode is in implicit mode, an access handler/barrier is asynchronously executed. Conversely, in an explicit mode, a flag is set instead of asynchronously executing the handler. In addition, during compilation convert explicit and convert implicit instructions are inserted to intelligently convert modes for precompiled and newly compiled binaries. Furthermore, new versions of newly compiled functions may be inserted to provide strong atomicity between previously and newly compiled functions.

20 Claims, 6 Drawing Sheets

(51) Int. Cl.
*G06F 9/30* (2006.01)
*G06F 9/38* (2006.01)
*G06F 9/46* (2006.01)
*G06F 12/08* (2006.01)

(52) U.S. Cl.
CPC ............ *G06F 9/3861* (2013.01); *G06F 9/467* (2013.01); *G06F 12/0837* (2013.01); *G06F 2212/62* (2013.01)

(56) References Cited

U.S. PATENT DOCUMENTS

| | | | |
|---|---|---|---|
| 5,428,761 A | 6/1995 | Herlihy | |
| 5,805,893 A | 9/1998 | Sproul | |
| 6,009,483 A | 12/1999 | Fueki | |
| 6,026,461 A | 2/2000 | Baxter | |
| 6,216,215 B1 | 4/2001 | Palanca | |
| 6,526,499 B2 | 2/2003 | Palanca | |
| 6,546,443 B1 | 4/2003 | Kakivaya et al. | |
| 6,591,414 B2 | 7/2003 | Hibi et al. | |
| 6,675,265 B2 | 1/2004 | Barroso et al. | |
| 6,697,919 B2 | 2/2004 | Gharachorloo et al. | |
| 6,701,518 B1 | 3/2004 | Dwyer et al. | |
| 6,711,672 B1 | 3/2004 | Agesen | |
| RE38,514 E | 5/2004 | James et al. | |
| 7,047,401 B2 * | 5/2006 | Seal ................. | G06F 9/3861 712/244 |
| 7,058,928 B2 | 6/2006 | Wygodny et al. | |
| 7,137,105 B2 | 11/2006 | Madsen et al. | |
| 7,370,251 B2 | 5/2008 | Nadeau-Dostie et al. | |
| 7,386,839 B1 | 6/2008 | Golender et al. | |
| 7,395,382 B1 | 7/2008 | Moir | |
| 7,395,418 B1 | 7/2008 | Caprioli et al. | |
| 7,478,210 B2 | 1/2009 | Saha et al. | |
| 7,496,716 B2 * | 2/2009 | Dice ................. | G06F 9/466 711/147 |
| 7,502,897 B2 | 3/2009 | Hertzberg | |
| 7,529,895 B2 | 5/2009 | Blumrich et al. | |
| 7,529,916 B2 | 5/2009 | Kershaw et al. | |
| 7,590,806 B2 | 9/2009 | Harris et al. | |
| 7,620,850 B2 * | 11/2009 | Lev ................. | G06F 11/362 714/35 |
| 7,669,040 B2 * | 2/2010 | Dice ................. | G06F 9/3004 707/610 |
| 7,730,286 B2 | 6/2010 | Petersen et al. | |
| 7,802,136 B2 | 9/2010 | Wang et al. | |
| 7,809,903 B2 | 10/2010 | Adl-tabatabai et al. | |
| 7,810,085 B2 | 10/2010 | Shinnar et al. | |
| 7,870,545 B2 * | 1/2011 | Saha et al. ................. | 717/159 |
| 7,895,582 B2 * | 2/2011 | Duffy et al. ................. | 717/140 |
| 7,958,319 B2 | 6/2011 | Saha et al. | |
| 7,984,248 B2 | 7/2011 | Kottapalli et al. | |
| 8,099,726 B2 | 1/2012 | Harris | |
| 8,117,605 B2 | 2/2012 | Lev et al. | |
| 8,140,773 B2 | 3/2012 | Saha et al. | |
| 8,181,158 B2 * | 5/2012 | Lev ................. | G06F 11/3612 717/124 |
| 8,185,698 B2 | 5/2012 | Saha et al. | |
| 8,190,859 B2 | 5/2012 | Akkary et al. | |
| 8,307,346 B2 | 11/2012 | Lev et al. | |
| 8,316,352 B2 * | 11/2012 | Lev ................. | G06F 11/362 717/145 |
| 8,601,456 B2 | 12/2013 | Duffy et al. | |
| 8,813,052 B2 * | 8/2014 | Gray ................. | G06F 9/3004 717/149 |
| 2001/0023479 A1 | 9/2001 | Kimura et al. | |
| 2002/0004897 A1 | 1/2002 | Kao et al. | |
| 2003/0200397 A1 | 10/2003 | McAllister et al. | |
| 2004/158678 A1 | 8/2004 | Chen | |
| 2004/0187115 A1 | 9/2004 | Tremblay et al. | |
| 2005/0047229 A1 | 3/2005 | Nadeau-Dostie et al. | |
| 2005/0086439 A1 | 4/2005 | Kaczynski | |
| 2005/0268021 A1 | 12/2005 | Dirscherl et al. | |
| 2006/0085588 A1 | 4/2006 | Rajwar et al. | |
| 2006/0109979 A1 | 5/2006 | Afzal et al. | |
| 2006/0161740 A1 | 7/2006 | Kottapalli et al. | |
| 2006/0277352 A1 | 12/2006 | Pong | |
| 2007/0118724 A1 | 5/2007 | Patel | |
| 2007/0136289 A1 | 6/2007 | Adl-Tabatabai et al. | |
| 2007/0143287 A1 * | 6/2007 | Adl-tabatabai et al. ........ | 707/8 |
| 2007/0143360 A1 | 6/2007 | Harris et al. | |
| 2007/0143755 A1 | 6/2007 | Saha et al. | |
| 2007/0150509 A1 | 6/2007 | Lev et al. | |
| 2007/0156780 A1 | 7/2007 | Saha et al. | |
| 2007/0156994 A1 | 7/2007 | Akkary et al. | |
| 2007/0162520 A1 | 7/2007 | Petersen et al. | |
| 2007/0169030 A1 * | 7/2007 | Tarditi ................. | G06F 9/466 717/140 |
| 2007/0186056 A1 | 8/2007 | Saha et al. | |
| 2007/0198781 A1 * | 8/2007 | Dice ................. | G06F 9/466 711/145 |
| 2007/0233990 A1 | 10/2007 | Kuczynski et al. | |
| 2007/0260608 A1 | 11/2007 | Hertzberg et al. | |
| 2007/0288900 A1 * | 12/2007 | Lev et al. ................. | 717/124 |
| 2007/0288901 A1 * | 12/2007 | Lev ................. | G06F 11/3612 717/124 |
| 2007/0300238 A1 | 12/2007 | Kontothanassis et al. | |
| 2008/0005504 A1 | 1/2008 | Barnes et al. | |
| 2008/0005607 A1 | 1/2008 | Fukatsu | |
| 2008/0010532 A1 * | 1/2008 | Lev ................. | G06F 11/362 714/35 |
| 2008/0021934 A1 | 1/2008 | Hudson et al. | |
| 2008/0022054 A1 * | 1/2008 | Hertzberg et al. ............ | 711/152 |
| 2008/0034359 A1 | 2/2008 | Duffy et al. | |
| 2008/0046661 A1 | 2/2008 | Saha et al. | |
| 2008/0046701 A1 | 2/2008 | Kershaw et al. | |
| 2008/0059717 A1 | 3/2008 | Saha et al. | |
| 2008/0065864 A1 | 3/2008 | Akkary et al. | |
| 2008/0115042 A1 * | 5/2008 | Akkary ................. | G06F 9/3004 714/806 |
| 2008/0127035 A1 * | 5/2008 | Lev ................. | G06F 11/362 171/100 |
| 2008/0127150 A1 | 5/2008 | Duffy et al. | |
| 2009/0006767 A1 | 1/2009 | Saha et al. | |
| 2009/0077339 A1 * | 3/2009 | Hertzberg et al. ............ | 711/170 |
| 2011/0087867 A1 * | 4/2011 | Jacobson ............ | G06F 9/30087 712/244 |
| 2012/0117333 A1 | 5/2012 | Akkary et al. | |

OTHER PUBLICATIONS

Ravi Rajwar, Maurice Herlihy, and Konrad Lai, "Virtualizing Transactional Memory," In Proc. of the 32nd Annual Intl. Symp. on Computer Architecture, Jun. 2005.
Kevin E. Moore, Jayaram Bobba, Michelle J. Moravan, Mark D. Hill & David A. Wood, "LogTM: Log-based Transactional Memory," HPCA 2006.
M. Herlihy, V. Luchango, M. Moir and W.N. Scherer, "Software Transactional Memory for Dynamic Sized Data Structures," PODC 2003.
K. Fraser and T. Harris, Concurrent Programming without Locks.
T. Harris and S. Marlow, S.P. Jones, and M. Herlihy; Composable Memory Transactions. In Proceedings of the Tenth ACM Symposium on Principles and Practice of Parallel Programming, 2005.
V.J. Marathe, W.N. Scherer III, and M.L. Scott; Adaptive Software Transactional Memory. In Proceedings of the Nineteenth International Symposium on Distributed Computing, 2005.
Timothy Harris, Mark Plesko, Avraham Shinnar and David Tarditi; Optimizing Memory Transactions. In Proceeding of Conference on Programming Language Design and Implementation, 2006.
H. Berenson, P. Bernstein, J. Gray, J. Melton, E. O'Neil, and P. O'Neil; "A critique of ANSI SQL isolation levels." in Proceedings of SIGMOD, pp. 1-10, 1995.
Torval Riegel, Christof Fetaer, and Pascal Felber, "Snapshot Isolation for Software Transactional Memory," TRANSACT '06.
"Implementing a High Performance Software Transactional Memory for a Multi-core Runtime," by Bratin Saha, Ali-Reza Adl-Tabatabai, Rich Hudson, Chi Coa Minh, and Ben Hertzberg; Proceedings of the eleventh ACM SIGPLAN symposium on Principles and practice of parallel programming, 2006.
"Software Transactional Memory," by N. Shavit and D. Tuitou, Proceedings of the Fourteenth ACM SIGACT-SIGOPS Symposium on Principles of Distributed Computing.

(56) References Cited

OTHER PUBLICATIONS

"Language Support for Lightweight Transactions," by T.L. Harris and K. Fraser, Proceedings of the 2003 ACM SIGPLAN Conference on Object-Oriented Programming Systems, Languages and Applications; and "Compiler and runtime support for efficient software transactional memory," by Ali-Reza Adl-Tabatabai, Brian Lewis, Vijay Menon, Brian Murphy, Bratin Saha, and Tatiana Shpeisman. Proceedings of the 2006 ACM SIGPLAN conference on Programming language design and implementation.

* cited by examiner

HANDLING PRECOMPILED BINARIES IN A HARDWARE ACCELERATED SOFTWARE TRANSACTIONAL MEMORY SYSTEM

CROSS-REFERENCE TO RELATED APPLICATION

This application is a continuation application of U.S. application Ser. No. 11/648,008, entitled "Handling Precompiled Binaries in a Hardware Accelerated Software Transactional Memory System," which was filed on Dec. 28, 2006, now U.S. Pat. No. 8,719,807.

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, with at least one of them modifying the entry, then one of the transactions may be aborted to resolve the conflict. One type of transactional execution includes a Software Transactional Memory (STM), where accesses are tracked, conflict resolution, abort tasks, and other transactional tasks are performed in software.

Typically a compiler compiles application code and inserts instructions/operations to perform the transaction tasks mentioned above. However, some portions of application code, such as specific functions, may include precompiled binaries. These binaries may not have been compiled with the appropriate instructions inserted to enable the operations of a software transactional memory system. As a result, the precompiled binaries may not be able to use software transactional memory for synchronization.

BRIEF DESCRIPTION OF THE DRAWINGS

The present invention is illustrated by way of example and not intended to be limited by the figures of the accompanying drawings.

FIG. 3b further illustrates a continued embodiment of FIG. 3a.

DETAILED DESCRIPTION OF THE DRAWINGS

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values.

The method and apparatus described herein are for handling precompiled binaries in a software transactional memory (STM) system. Specifically, handling precompiled binaries in a software transactional memory (STM) system is primarily discussed in reference to multi-core processor computer systems. However, the methods and apparatus for handling precompiled binaries in a software transactional memory (STM) system are not so limited, as they may be implemented on or in association with any uniprocessor computer system or integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
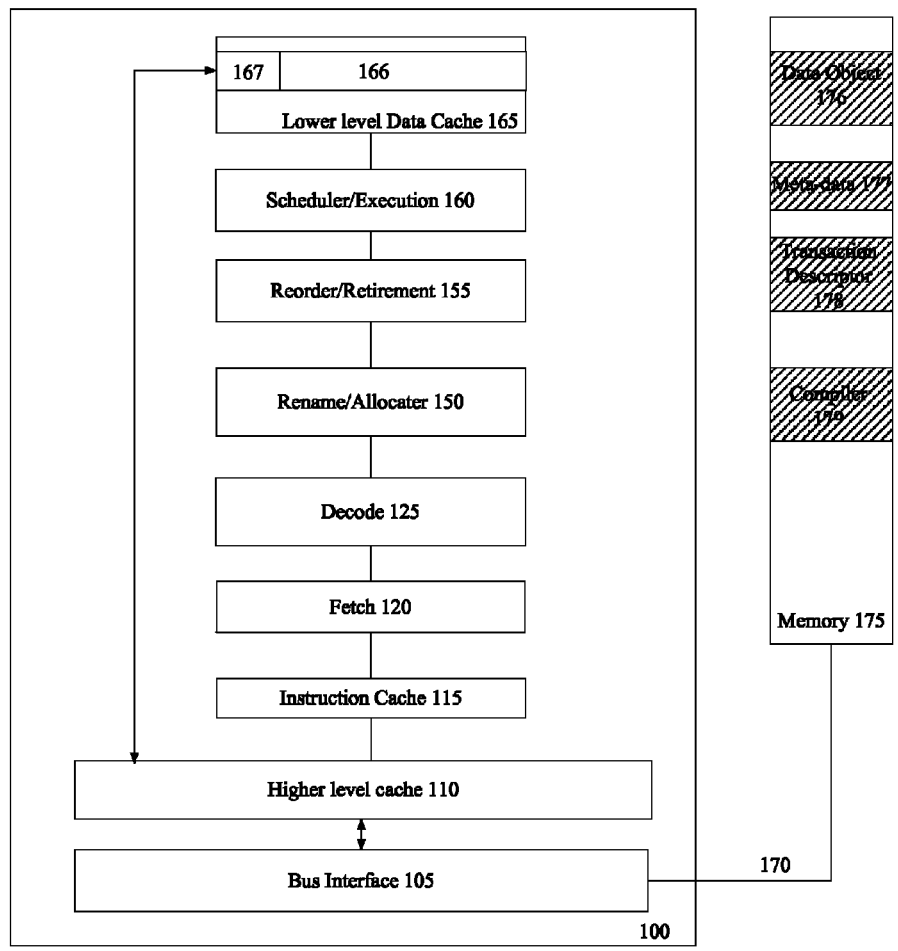
FIG. 1 illustrates an embodiment of a system capable of transactional execution.

Referring to FIG. 1, an embodiment of a processor capable of handling precompiled binaries in a software transactional memory (STM) system is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may physically overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a norh bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements.

Allocator and renamer module 150 includes an allocator to reserve resources, such as register files to store instruction processing results and a reorder buffer to track instructions. Unit 130 may also include a register renamer to rename program/instruction reference registers to other registers internal to processor 100.

Reorder/retirement module 125 includes components, such as the reorder buffers mentioned above, to support out-of-order execution and later retirement of instructions executed out-of-order. In one embodiment, where processor 100 is an in-order execution processor, re-order/retirement module 155 may not be included.

Scheduler and execution module 120, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands. In one embodiment, a data translation lookaside buffer (DTLB) is associated with lower level data cache 165. Often a processor logically views physical memory as a virtual memory space. As a specific example, a processor may include a page table structure to break physical memory into a plurality of virtual pages. Here, a DTLB supports translation of virtual to linear/physical addresses. Data cache 165 may be utilized as a transactional memory or other memory to track tentative accesses during execution of a transaction, as discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads. A hardware thread typically refers to any logic located on an integrated circuit capable of maintaining an independent architectural state, wherein the independently maintained architectural states share access to some execution resources. For example, smaller resources, such as instruction pointers, renaming logic in rename allocater logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Logical processors including cores and/or threads may also be referred to herein as resources or processing resources. Therefore, a processor, such as processor 100, is capable of executing multiple threads on multiple logical processors/ resources. Consequently, multiple transactions may be simultaneously and/or concurrently executed in processor 100.

A transaction includes a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendancy, the transaction is restarted without making the updates globally visible. As a result, pendancy of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking access during execution of a transaction with processor 100 in hardware of processor 100. For example, a cache line 166 is to cache data item/object 176 in system memory 175. During execution of a transaction, annotation/attribute field 167, which is associated with cache line 166, is utilized to track accesses to and from line 166. For example, attribute field 167 includes a transaction read bit to track if cache line 166 has been read during execution of a transaction and a transaction write bit to track if cache line 166 has been written to during execution of the transaction.

Attribute field 167 is potentially used to track accesses and detect conflicts during execution of a transaction, as well as upon attempting to commit the transaction. For example, if a transaction read bit in field 167 is set to indicate a read from line 166 occurred during execution of a transaction and a store associated with line 166 from another transaction occurs, a conflict is detected. Examples of utilizing an attribute field for transactional execution is included in U.S. Pat. No. 7,984,248, entitled "Transaction based shared data operations in a Multiprocessor Environment."

A Software Transactional Memory (STM) system often refers to performing access tracking, conflict resolution, or other transactional memory tasks in software. As a general example, compiler 179 in system memory 175, when executed by processor 100, compiles program code to insert read and write barriers into load and store operations, accordingly, which are part of transactions within the program code. Compiler 179 may also insert other transaction related operations, such as commit or abort operations. Insertion of operations by a compiler, such as compiler 179, are discussed in more detail below.

As shown, cache 165 is still to cache data object 176, as well as meta-data 177 and transaction descriptor 178. However, meta-data location 177 is associated with data item 176 to indicate if data item 176 is locked. A read log, which may be present in transaction descriptor 178, is used to log read operations, while a write buffer or other transactional memory, which may include lower-level data cache 165, is used to buffer or log write operations. Inserted calls for validation and commit utilize the logs to detect conflicts and validate transaction operations.

Figure 2:
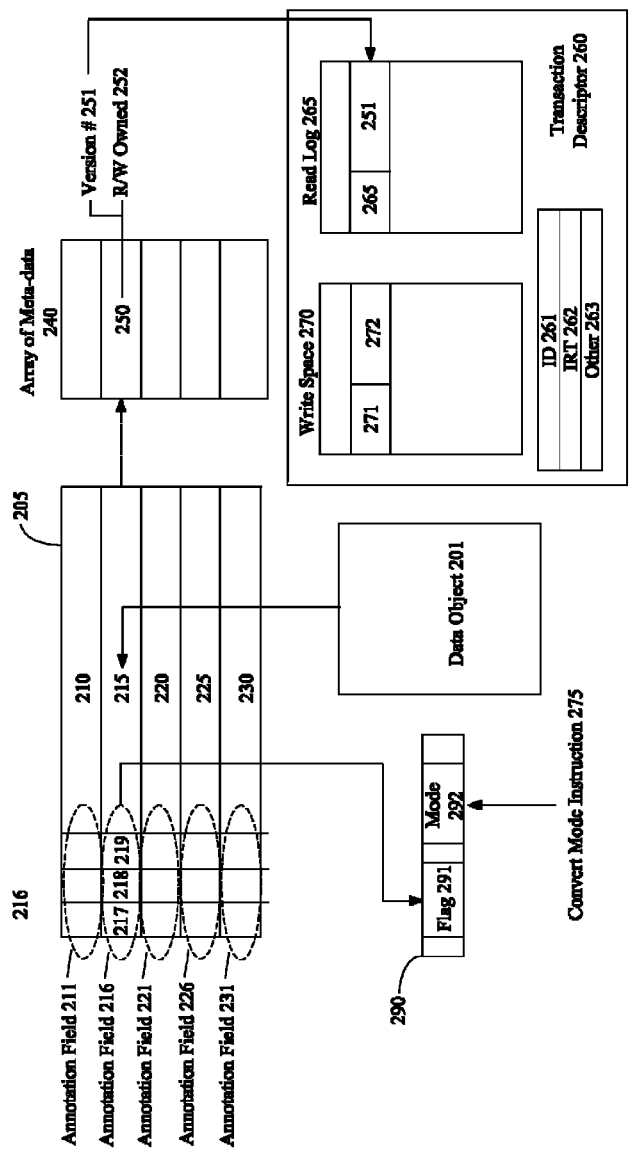
FIG. 2 illustrates an embodiment of a hardware accelerated STM capable of handling precompiled binaries.

Referring to FIG. 2, an embodiment of a system including annotation fields to accelerate an STM capable of handling precompiled binaries is depicted. Data object 201 includes any granularity of data, such as a bit, a word, a line of memory, a cache line, a table, a hash table, or any other known data structure or object. For example, a programming language defined data object is data object 201. Transactional memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201 is capable of being stored unaligned in memory 205.

In one example, each data object is associated with a meta-data location in array of meta-data 240. As an illustrative embodiment, an address associated with cache line 215 is hashed to index array 240, which associates meta-data location 250 with cache line 215 and data object 201. Note that data object 201 may be the same size of, smaller than (multiple elements per line of cache), or larger than (one element per multiple lines of cache) cache line 215. In addition, meta-data location 250 may be associated with data object 201 and/or cache line 215 in any manner.

Usually, meta-data location 250 represents whether data object 201 is locked or available. In one embodiment, when data object 201 is locked, meta data location 250 includes a first value to represent a locked state, such as read/write owned state 252. Yet, any lock or lock state may be utilized and represented in meta-data location 250. When unlocked, or available, meta-data location 250 includes a second value. In one embodiment, the second value is to represent version number 251. Here, version number 251 is updated, such as incremented, upon a write to data object 201, to track a current version of data object 201.

As an example to illustrate operation of the embodiment shown in FIG. 2, in response to a first read operation in a transaction referencing data object 201/cache line 215, the read is logged in read log 265. In one embodiment read log 265 is included in transaction descriptor 260. Transaction descriptor may also include write space 270, as well as other information associated with a transaction, such as transaction identifier (ID) 261, resource structure, and other transaction information. However, write space 270 and read log 265 are not required to be included in transaction descriptor 260. For example, write space 270 may be separately included in a different memory space from read log 265 and/or transaction descriptor 260.

In one embodiment, logging a read includes storing version number 251 and an address associated with data object 201 or cache 215 in read log 265. Here, assume version number 251 is one to simplify the example. Upon encountering a write referencing an address associated with data object 201, the write is potentially logged or tracked as a tentative update. In addition, the meta-data location is updated to a lock value, such as two, to represent data object 201 is locked by the transaction or resource executing the transaction. In one embodiment, the lock value is updated utilizing an atomic operation, such as a read, modify, and write (RMW) instruction. Examples of RMW instructions include Bit-test and Set, Compare and Swap, and Add.

In one embodiment, the write updates cache line 215 with a new value, and an old value 272 is stored in write space 270. Here, upon committing the transaction, the old values in the write space are discarded, and conversely, upon aborting the transaction, the old values are restored, i.e. the locations are "rolled-back" to their original values before the transaction. Examples of write space 270 include a write log, a group of check pointing registers, and a storage space to log/checkpoint values to be updated during a transaction.

In another embodiment, write space 270 is a buffer that buffers/stores the new value to be written to data object 201.

Here, in response to a commit, the new values are written to their corresponding locations, while in response to an abort the new values in write space 270 are discarded. More information on efficient checkpointing and roll-back for transactions is discussed in U.S. Pat. No. 7,802,136, entitled "Compiler Technique for Efficient Register Checkpointing to Support Transaction Roll-back."

Continuing the example from above, whether write space 270 is utilized as a write-buffer, a write-log, or not at all, the write, when committed, releases lock 250. In one embodiment, releasing lock 250 includes incrementing or setting meta-data location 250 to an odd value to represent an unlocked state. In this embodiment the odd number is the next highest odd number after the previous value of lock 250, which is three in this example. This versioning allows for other transactions to validate their reads that loaded data object 201 by comparing the other transactions logged version values in their read logs to current version value 251.

The example above includes one embodiment of implementing an STM; however, any known implementation of an STM may be used. STMs are discussed in the following articles: "Implementing a High Performance Software Transactional Memory for a Multi-core Runtime" by Bratin Saha, Ali-Reza Adl-Tabatabai, Rick Hudson, Chi Cao Minh, and Ben Hertzberg, Proceedings of the eleventh ACM SIGPLAN symposium on Principles and practice of parallel programming; "Software Transactional Memory" by N. Shavit and D. Tuitou, Proceedings of the Fourteenth ACM SIGACT-SIGOPS Symposium on Principles of Distributed Computing; "Language Support for Lightweight Transactions", by T. L. Harris and K. Fraser, Proceedings of the 2003 ACM SIGPLAN Conference on Object-Oriented Programming Systems, Languages and Applications; and "Compiler and runtime support for efficient software transactional memory," by Ali-Reza Adl-Tabatabai, Brian Lewis, Vijay Menon, Brian Murphy, Bratin Saha, and Tatiana Shpeisman. Proceedings of the 2006 ACM SIGPLAN conference on Programming language design and implementation." In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system.

In addition, FIG. 2 illustrates annotation fields 211, 216, 221, 226, and 231, which are associated with memory lines 210, 215, 220, 225, and 230, respectively. In one embodiment, annotation field 216 is included in cache line 215. In another embodiment, annotation field 216 is included in a separate array and is associated with line 215. Here, separate ports may be provided for access to annotation field 216, which potentially allows for concurrent access to cache lines and annotation fields.

In one embodiment, annotation field 216 is to accelerate operation of an STM, such as the STM protocol illustrated in FIG. 2. As a first example, bits 218 and 219 are included to track reads and writes to line 215, respectively. Bits 218 and 219 are initialized to a default value, such as a logical zero. In response to a read operation, bit 218 is set to a second value, such as a logical one to represent a read to line 215 has occurred. In addition, barrier operations, such as the version logging discussed above or acquiring a lock, are performed. Bit 219 is set in a similar manner to track writes. Upon detecting a subsequent read within the same transaction to line 215, bit 218 is checked. Here, bit 218 holds the second value to indicate a previous read to line 215/data object 201 has occurred during a pendancy of the transaction. As a result, the barrier operations discussed above may be elided, i.e. not performed, as they have already been performed for the first read.

As a second example, annotation field 216 may be used to accelerate accesses in an STM through temporal and/or locality hints. For example, when annotation field 216 includes a first value, such as bit 219 being set to a logical one, while bits 217 and 218 are set to a logical zero, the first value indicates a most recent version of data object 201 resides in cache line 215, not in write space/buffer 270. As can be seen, other values in annotation field 216 may indicate other location information. U.S. Pat. No. 8,185,698, entitled "Hardware Acceleration of a write-buffering software transactional memory," discusses hardware acceleration of an STM including examples of eliding access barriers and providing temporal/locality hints. U.S. Patent Application Publication No. 2008/0005504, entitled "Overflow Method for Virtualized Transactional Memory," discusses use of attribute bits to track access, as well as extending/virtualizing an HTM.

However, application/code potentially references precompiled binaries, such as precompiled libraries and Dynamic Link Libraries (DLLs), which don't include compiler inserted instructions to utilize annotation fields to accelerate transactional execution. In one embodiment, a processor, such as processor 100, is capable of operating in two modes of execution to enable operation of an STM on legacy code and precompiled binaries to ensure accurate access tracking and conflict detection during transactional execution.

Here, in response to encountering a first access referencing data object 201 and cache line 215 in a first transaction, annotation field 216 is checked. If annotation field 216 represents cache line 215 has been accessed in the same manner previously during the transaction, i.e. annotation field 216 includes an accessed value, then the access is performed normally. However, if the annotation field is not set, i.e. includes an unaccessed value, a handler, such as a runtime handler, is executed, if the processor is in a first mode of execution. In one embodiment, the handler is an access barrier associated with the access. In addition, the address referenced by the access is placed in a register to be utilized by the runtime handler. In one embodiment, the first mode of operation is an implicit mode of execution. Here, in response to encountering a first access to line 215 an asynchronous trap to an access barrier is taken to perform access barrier operations, such as logging, lock acquiring, and setting of annotation field 216. These operations are also commonly referred to as bookkeeping for a transaction.

Yet, if the processor is in a second mode of execution, the processor is to set flag field 291 to a flag/flagged value in storage element 290 in response to annotation field 216 not being set, i.e. including the unaccessed value. In one embodiment, the second mode is an explicit mode of execution. Here, the processor does not asynchronously take the trap to the runtime handler, but rather sets field 291 to the flagged value. The flagged value includes any value to indicate a flag is set. For example, if flag field 291 includes one bit, a logical zero may represent the flag is not set, while a logical one indicates the flag is set. Here, the flag or flagged value is a logical one. In addition, annotation field 216 may be set by executed instruction inserted by a compiler to set and unset bits. Later, in response to the flag being set to the flag value, a handler or other operation may synchronously be executed.

Therefore, an annotation field 216 may be set to an accessed value to indicate a previous access to line 215 within a handler, such as during an implicit mode of execution. As an example of an accessed value, assume the access is a load from line 215. Here, the accessed value includes any value with bit 218 set to a logical one to indicate a load has occurred from line 215. As shown, annotation field 216 includes three bits; therefore, in this case the accessed value is two, three, six, or seven, i.e. bits 217 and 219 including a logical one or zero with bit 218 set to a logical one. However, an accessed value includes any state, value, or representation to indicate an associated access, such as a read or write, has occurred to line 215.

In one embodiment, storage element 290 includes mode field 292 to hold a first value to represent the first mode of operation and to hold a second value to represent the second mode of operation. As an example, storage element 290 is a register in a processor, such as a Machine Specific Register (MSR); however, storage element 290 may be any element for storing information. As illustrated in FIG. 2, flag field 291 and mode field 292 are included in the same storage element. Alternatively, flag field 291 and mode field 292 are stored in separate storage elements. Therefore, when an access is encountered, if mode field 292 includes an implicit mode value, an asynchronous trap to a runtime handler is executed. However, if mode field 292 holds an explicit mode value, then the asynchronous trap is not taken and flag field 291 is set. Note that register 290 may be replicated for resources, such as cores and/or threads, on a processor, such that each resource may potentially be in different modes.

In one embodiment, convert mode instructions, when executed, are to convert execution modes. For example, a convert to a first mode instruction, such as a convert implicit instruction, is to store a first implicit value in mode field 292 to transition a processor into the first implicit mode, while a convert to a second mode instruction, such as a convert to explicit instruction, is to store a second explicit value in mode field 272 to transition a processor into the second explicit mode.

As an example, assume a first access in a transaction is a read operation or load operation. In response to encountering the read operation, bit 218 is checked. In one embodiment, a loadAndCheck instruction, when executed, checks bit 218, and performs a load of line 215 in response to annotation field holding an accessed value, i.e. a value including bit 218 set to a first logical value to indicate a previous read from line 215. However, if bit 218 is in a default state indicating no previous load during a pendancy of the transaction, then bit 218 is potentially set and a read handler is executed in response to mode field 292 being set to the first value to indicate an implicit mode of execution. An embodiment of pseudo code for a read handler is included below in Figure A.

```
readHandler( ) {
    uint32 address = getAddressfromChannel( );
    If (checkForLivelock == True) { /* we could live lock because of
    cache line evictions */
        setModeToAfter;
        clearAnnotationBit;
        noteInTransactionDescriptorLivelockResolved;
        reexecute the load instruction;
        On next invocation of handler
            setModeToBefore
            setAnnotationBit
            return
    }
    Perform barrier operation;
    return;
}
```

Figure A: An Embodiment of Pseudo-Code for a Read Handler

Here, the illustrative pseudo-code, when executed, is to perform the following read handler/barrier tasks. An address associated with cache line 215 is retrieved from a storage element, such as a register, which the address is placed into before executing the read handler. Next, it is determined if a live-lock event associated with cache line 215 is occurring. If a live-lock event is detected, then a handler mode is set to an after mode to execute the read handler code after the read is performed. In one embodiment, a default handler mode is a before handler mode to execute the handler before an access operation, such as a read, is performed. Here, the read handler is executed before the read is performed, and if a live-lock event is detected, then the read handler is set to the after mode to ensure the read handler is executed again after the read is performed.

In addition, bit 218 is cleared/reset to ensure upon re-executing of the read/load instruction in the next line of the pseudo code, that the loadAndCheck instruction does not determine bit 218 is set and elides the read handler/barrier to directly perform the load. As a result, upon re-execution of the loadAndCheck instruction the read handler is executed again. In one embodiment, when the loadAndCheck instruction is re-executed, the bookkeeping/barriers for the load have already been performed. However, this time on the next invocation of the read handler, the handler mode is set back to the default before instruction mode and the annotation bit is set.

After checking for a live-lock, a barrier operation is performed. Examples of barrier operations include logging the read as discussed above, acquiring a lock for the read operation, and a store to update information in a transaction descriptor associated with the transaction. However, any bookkeeping or other transaction related tasks may be performed here.

Previously, in response to encountering the read operation a read handler, in one embodiment, is asynchronously executed as the resource executing the transaction is in an implicit mode of execution. However, if the resource is in an explicit mode of execution, in one embodiment, bit 218 is set but the read handler is not asynchronously executed. Instead, flag field 291 is set to a flag value to indicate a read bit, such as bit 218, has been set. In response to flag field 291 being set, any operation or set of operations, such as a read handler may be executed. In one embodiment, the read handler is executed at a later time by synchronous operation of a resource, instead of asynchronously interrupting an execution flow.

To further the illustrative example, in response to encountering a subsequent read operation/instruction, such as another loadAndCheck instruction, referencing cache line 215 in the first transaction, annotation bit 218 is checked. However, this time bit 218 is set from the previous read. As a result, whether in the first mode or the second mode, the read barrier operations are elided and the load is performed.

Similar in operation to a loadAndCheck instruction in an implicit mode and an explicit mode, a storeAndCheck instruction, when executed, performs in a similar manner. For example, in response to encountering a store operation referencing line 215 in a transaction, bit 219 is checked. If bit 219 is set to an accessed value, the store is directly performed, i.e. barriers, such as executing a store handler, acquiring a write lock, setting a flag, are elided. If bit 219 is cleared, i.e. set to an unaccessed value, bit 219 is set and a store handler is asynchronously executed in response to a resource being in an implicit mode.

In one embodiment, the store handler is similar to the read handler. As an example, instructions in the store handler, when executed, check to see if the system is livelocking. If the system is not potentially livelocked, then a lock for the store is acquired. If the livelock is a possibility, then a handler mode is changed to an after instruction mode, annotation bit 219 is cleared/reset, a field is set in a transaction descriptor to indicate a livelock resolution mode, and then returns. After the store is performed, the store handler is executed, as it is set to the after instruction execution mode. When the store handler is re-executed the mode is modified back to a before instruction mode and annotation bit 219 is set. In contrast to an implicit mode, if bit 219 is cleared upon encountering the store operation, and the resource is in an explicit mode, a flag, such as flag 291 is set without asynchronously executing the store handler.

Figure 3A:
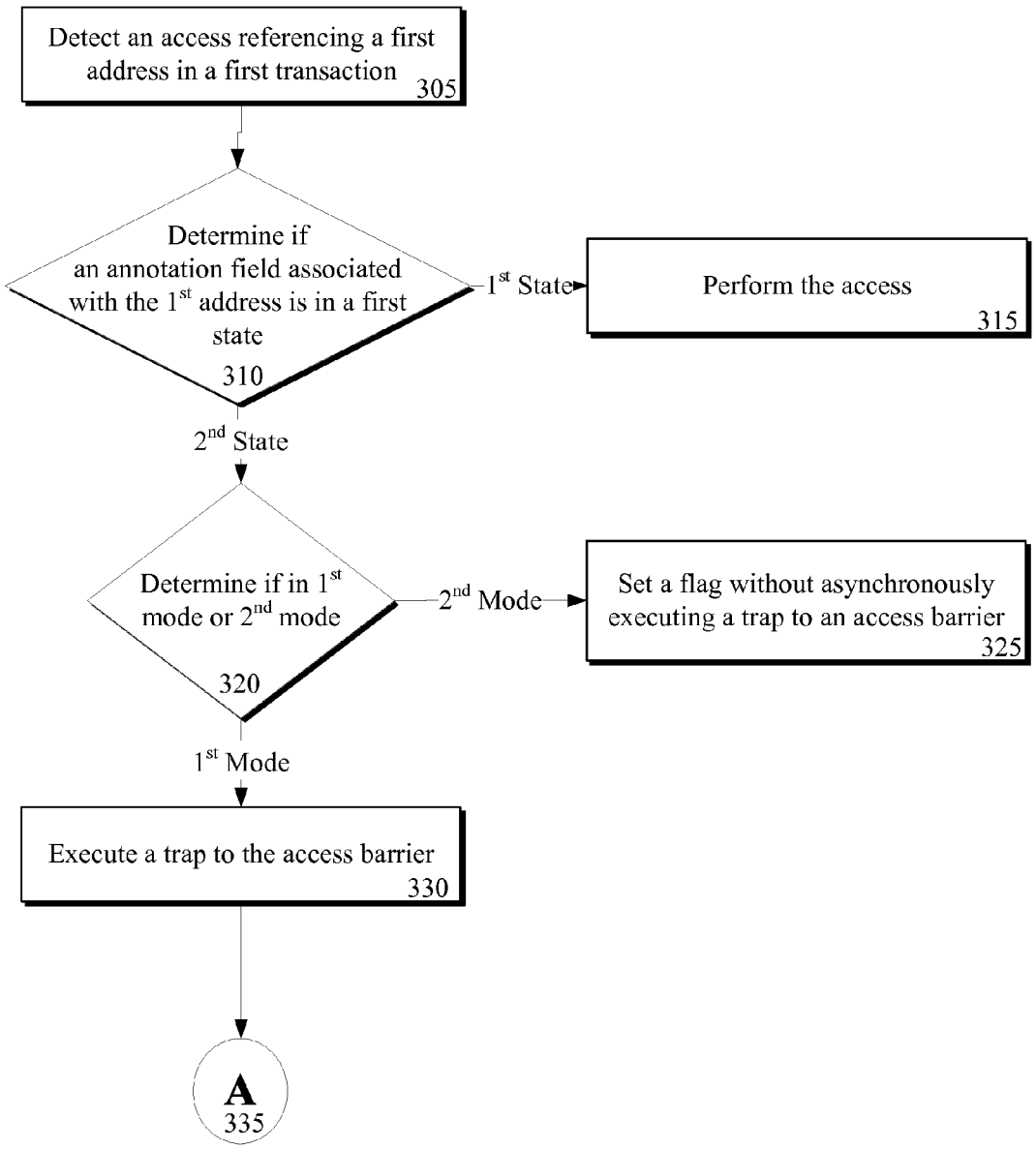
FIG. 3a illustrates an embodiment of a flow diagram for a method of handling precompiled binaries in an accelerated Software Transaction Memory (STM) system.

Referring to FIG. 3a, an embodiment of a flow diagram for a method of handling precompiled binaries and legacy code in a hardware accelerated STM is illustrated. In flow 305, an access, such as a read or write, referencing a first address in a first transaction is encountered. It is determined, in flow 310, if an annotation field associated with the first address, such as an annotation field included in a cache line associated with the address, is in a first state. In one embodiment, an annotation field in a first state includes an accessed value to indicate the address has been previously accessed in a similar manner during a pendancy of the transaction.

If the annotation field is in the first state, then the access is performed in flow 315. However, if the annotation field is in a second state, such as including unaccessed value, to indicate that the address has not been previously accessed in the same manner during execution of the transaction, then in flow 320 it is determined if a resource executing the transaction is in a first mode, such as an implicit mode, or a second mode, such as an explicit mode. In one embodiment, a mode is determined from a field in a storage element associated with the resource executing the transaction. Note, before or after flow 320, the annotation field may potentially be set to the accessed value in response to encountering the access.

Figure 3B:
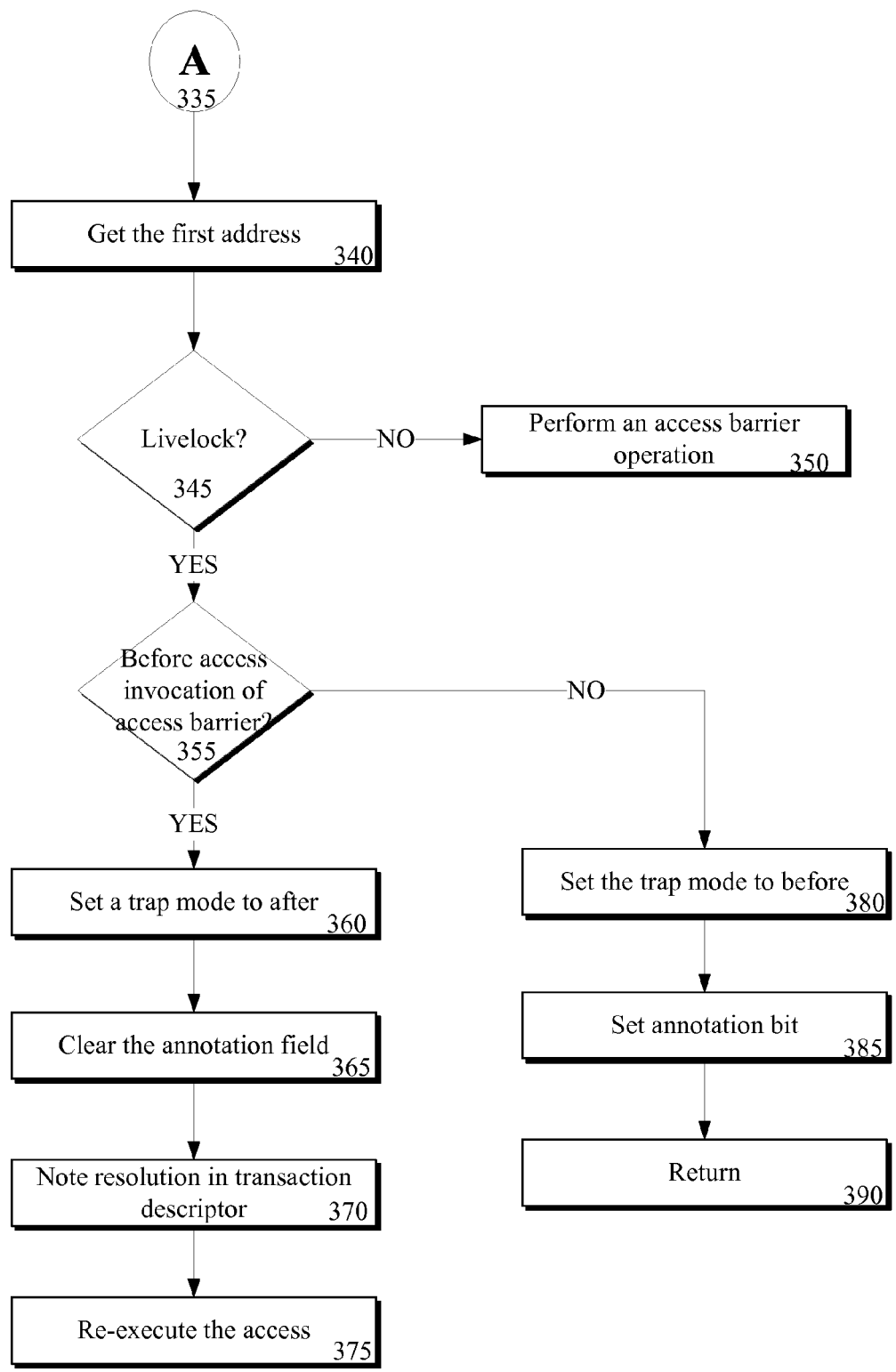

If the resource is in a second mode, then a flag is set in flow 325. In one embodiment, the flag is set without asynchronously executing the trap to an access barrier. However, if the resource is in the first mode, then a trap to then access barrier, such as a read handler as discussed above, is executed in flow 330. The embodiment continues to FIG. 3b through flow 335 including an embodiment of the access barrier, i.e. a read handler.

In flow 340, the first address, which was placed in a register before executing the trap to the read handler, is retrieved. Next in flow 345, it is determined if contention, such as livelocking, potentially exists in association with the first access. Any method for detecting a live-lock event or determining a potential live-lock exists may be used. If no live locking potentially exists, then an access barrier operation is performed. Examples of access barrier operations include acquiring a lock, logging an access, validating an access, modifying/updating fields in a transaction descriptor, or other transaction related bookkeeping task.

However, if a live-lock potentially exists then in flow 355 it is determined if the access barrier is being executed before the access instruction is performed. In one embodiment, if a handler mode is set to a before an instruction mode, then it is determined the execution is a first pass execution of the access barrier before performing the access. Here, if the mode is set to an after instruction mode, then it is determined the execution is a second pass execution of the access barrier after performing the access. However, a count or other variable may be used to determine if the handler is being executed for a first time in response to encountering the access.

If the invocation of the access barrier is before performing the access, then in flow 360 the trap mode is set to an after instruction mode. The annotation field is cleared, and a field is set in an associated transaction descriptor to indicate a live-lock resolution mode in flows 365 and 370. The access instruction, such as a loadAndCheck or storeAndCheck access instruction, is re-executed in flow 375. Here, the trap mode is set to after the instruction mode, so the access is performed. As the annotation field was cleared in flow 365, the trap to the access barrier is re-executed and returns to flow 355. This time, execution of the handler is after performing the access. As a result, in flow 380 the trap mode is reset back to a before instruction mode, the annotation field is set to an accessed value in flow 385, and execution returns in flow 390.

Figure 4:
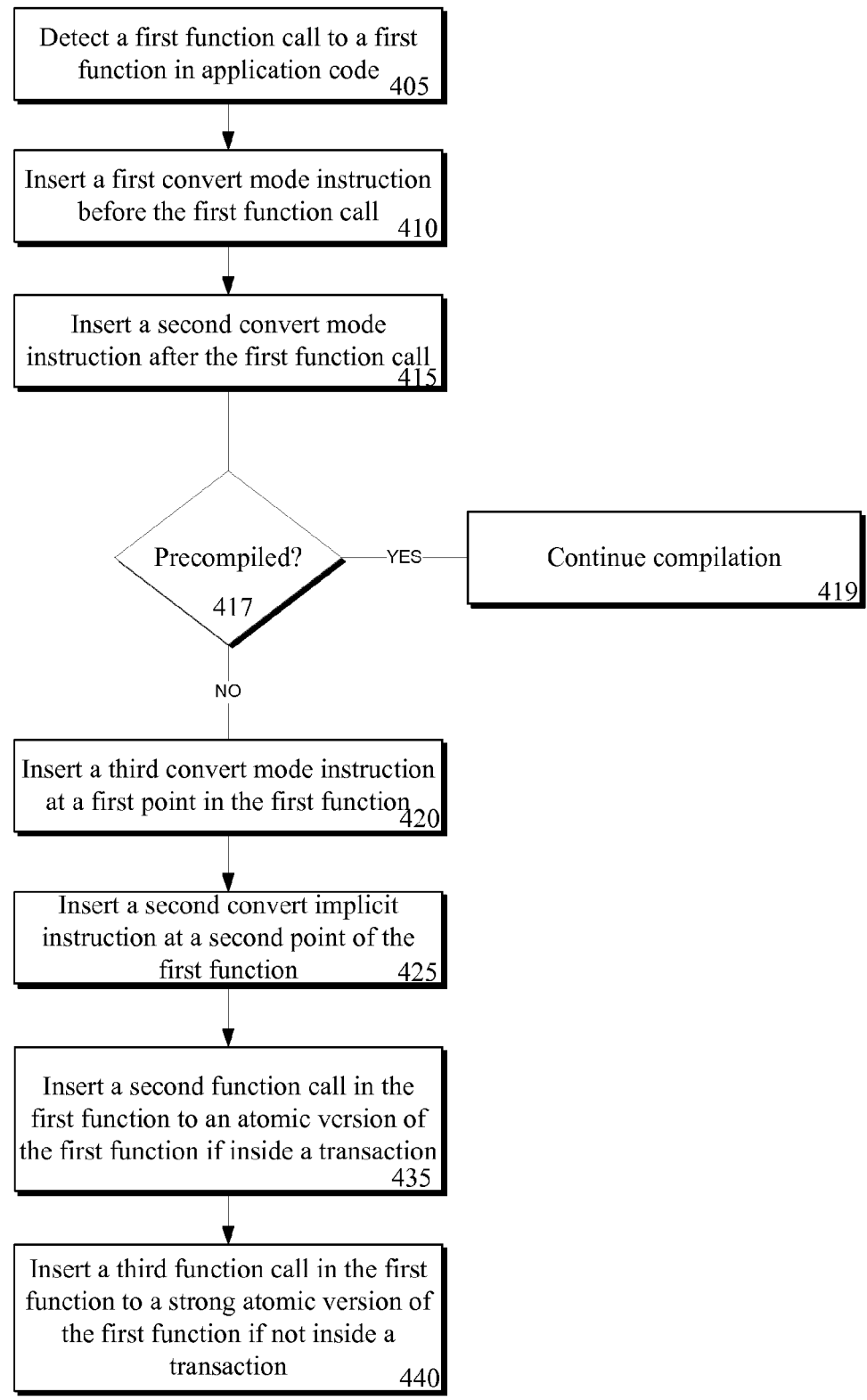
FIG. 4 illustrates an embodiment of a flow diagram for inserting instructions and function calls into code to handle precompiled binaries.

As illustrated in FIG. 1, a compiler, when executed, to compile and/or optimize program/application code, instructions such as, loadAndCheck instructions, storeAndCheck instructions, convertImplicit instruction, convertExplicit instruction, changeTraptoAfter instructions, and changeTraptoBefore instructions, as well as new function calls and operations may be inserted to handle precompiled binaries in a hardware accelerated STM. Turning to FIG. 4, an embodiment of a flow diagram for inserting instructions and function calls to handle legacy code in a hardware accelerated STM is illustrated.

In flow 405 a first function call to a first function in application code is detected. In one embodiment, the function call comprises a call to a legacy code function or function including precompiled binaries, such as legacy DLLs and libraries. In another embodiment, the first function is a function capable of being newly compiled. As a compiler optimization, the convert mode instruction described below in flows 410 and 415 may potentially be inserted in front and behind of precompiled binary calls. However, during compilation, in one embodiment, convert mode instructions are inserted for all detected calls.

In flow 410, a first convert mode instruction is inserted before the first function call. In one embodiment, the first convert mode instruction, when executed by a resource, is to set a mode field in a resource to a first value to represent a first mode of execution. In flow 415, a second convert mode instruction is inserted after the first function call. As an example, the second convert mode instruction, when executed by the resource, is to set the field in the resource to a second value to represent a second mode of execution. In one embodiment, the mode field is included in a machine specific register (MSR) of a processor associated with the resource.

As an illustrative example, the first convert mode instruction is a first convert implicit instruction and the first mode is an implicit mode of execution. The second convert mode instruction is a first convert explicit instruction and the second mode is an explicit mode of execution. Figure B illustrates an embodiment of pseudo code for inserted convert mode instructions. Here, a call to function foo is compiled with a convertImplicit instruction before and a convertExplicit function after the call to foo. Here, if foo is a precompiled binary, then the execution mode is in an implicit mode to ensure a handler performs transaction bookkeeping for access tracking and conflict detection.

call foo→convertImplicit; call foo; convertExplicit

Figure B: An Embodiment of Pseudo Code for Inserted Convert Mode Instructions

In flow 417, it is determined if the first function is a precompiled function or a function to be newly compiled. If the function is precompiled, new instructions potentially are not able to be inserted within the function, so compilation of the program code continues in flow 419. However, if the first function is newly compiled, then in flow 420, a third convert mode instruction, such as a second convert explicit instruction, is inserted at first point in the first function. In flow 425, a fourth convert mode instruction, such as a second convert implicit instruction, is inserted at a second point of the first function. In one embodiment, the second point is after the first point in the first function. An example of inserted instructions and calls in a newly compiled function foo is illustrated in Figure C.

```
foo(args) {
    convertExplicit;
    if inside transaction
        call foo__atomic;
    else
        call foo__strongatomic;
    convertImplicit;
}
```

Figure C: An Embodiment of Inserted Instructions and Calls in a Newly Compiled Function In one embodiment, newly compiled functions include two variants/versions of calls. As precompiled binaries may be called inside or outside a transaction, in one embodiment, the two versions of function calls are inserted to handle strong atomicity between precompiled code and newly compiled code. Essentially, transactional semantics are to be provided for precompiled code called from outside a transaction. Therefore, in the example above, a second function call is inserted to call an atomic version of the function foo in flow 435, and a third function call is inserted to call a strong atomic version of the function foo in flow 440.

Here, when a strong atomic version is called outside a transaction, there is no commit instruction to release locks acquired to provide transactional semantics. Therefore, in one embodiment a timer channel is setup, i.e. loadAndCheck and storeAndCheck instructions to perform loads and stores utilize normal Authorized Program Facility (APF) channels. The channels fire, which triggers execution of an associated handler, when an annotation field/bit is cleared or when the timer channel expires. This enables strong atomicity since a handler is invoked periodically, i.e. from time to time, allowing locks to b released. An embodiment of a timer handler is illustrated below in Figure D.

```
timerHandler( ) {
    if (insideTransaction == True) /* we don't need to bother about
    strong atomicity */
        return;
    releaseAllLocks; /* release locks acquired due to strong atomicity */
}
```

Figure D: An Embodiment of a Timer Handler

Figure 5:
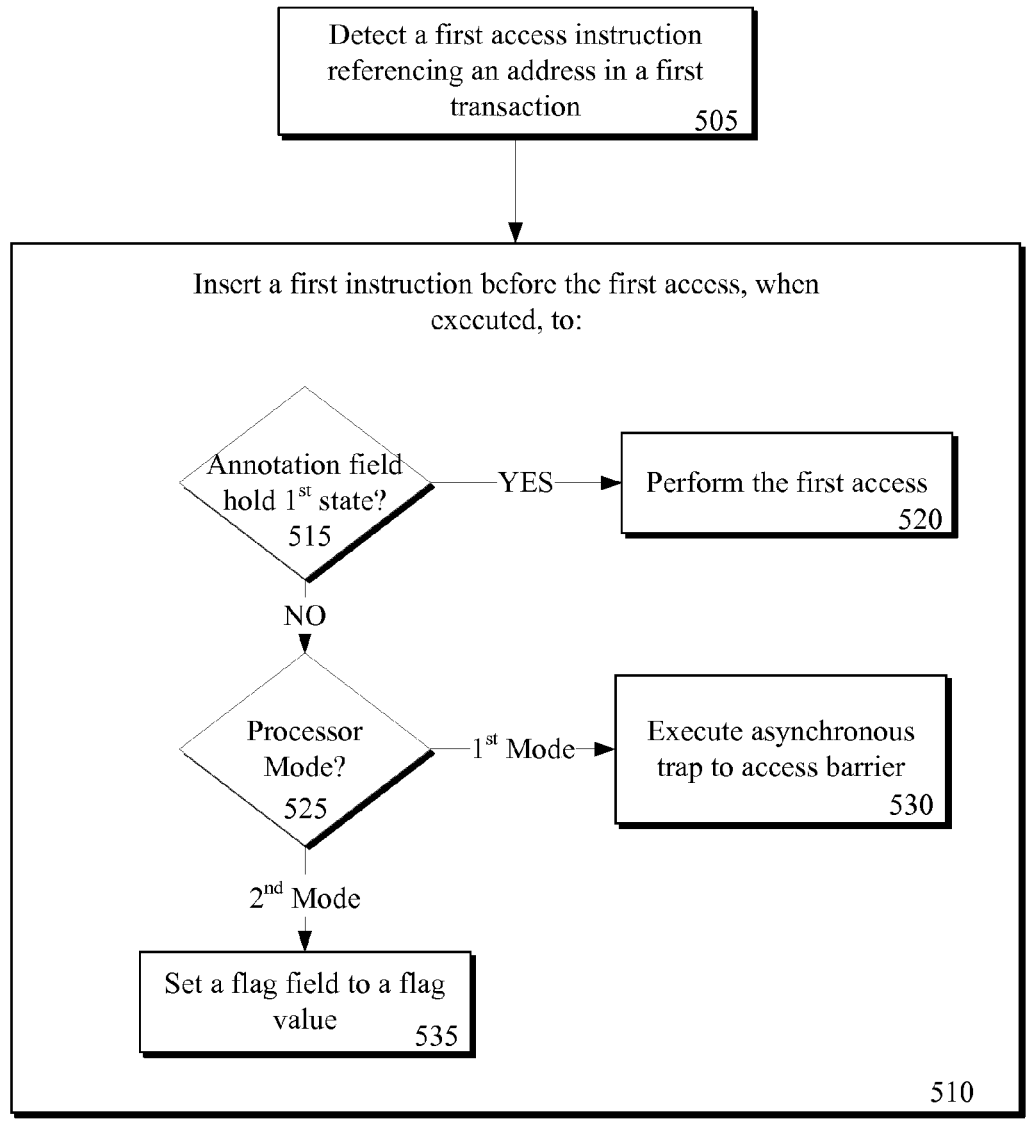
FIG. 5 illustrates a flow diagram for a method inserting an access instruction to accelerate an STM capable of execution in multiple modes.

Turning to FIG. 5, an embodiment of inserting instructions to enable an STM operation on legacy binaries is illustrated. In flow 505, a first access instruction referencing an address in a first transaction is detected. In one embodiment, the first access instruction is a load instruction. In another embodiment, the first access instruction is a store instruction. In flow 510 a first instruction is inserted before the first access instruction. Examples of the first instruction to be inserted include a loadAndCheck, a storeAndCheck, and any other instruction(s) for performing the operations discussed below.

In one embodiment, the first instruction, when executed by a processor, is to determine if an annotation field associated with the address holds a first state in flow 515. If the annotation holds the first state, such as an accessed value, the access is performed in flow 520. However, if the annotation field is not in the first state, such as including an unaccessed value, then in flow 525 a processor mode is determined. As an example, a mode field in a register is checked to determine the mode. If the processor is in a first mode, such as an implicit mode, an asynchronous trap to an access barrier/handler is executed in flow 530. However, if the processor is in a second mode, such as an explicit mode, then a flag field is set to a flag value in flow 535 and the asynchronous trap is not executed.

To illustrate assume an instruction or operation including a load is detected. A first instruction is inserted during compilation. When the first instruction is executed, it checks a load annotation bit in an annotation field associated with a memory line to be loaded from. If the load annotation bit is set indicating a previous load from the memory line has occurred during execution of the transaction, then the load is performed. However, if the annotation bit is cleared indicating no previous load, then an asynchronous trap to a read handler is executed if the resource executing the transaction is in an implicit mode. Conversely, a flag field is set to a flagged value without executing the asynchronous trap, if the resource is in a second explicit mode of execution.

In one embodiment, the read handler includes the following operations. A first operation, when executed, to read an address associated with a load and a second operation, when executed, to perform a read handler operation. Examples of a read handler operation include logging the load, acquiring a lock for the address, and validating a previous load. In addition, a third operation, when executed, is to check if there is a livelock associated with the address. In response to a livelock, an after mode operation, when executed, is to set a trap mode to after the load is performed, a clear field operation, when executed, is to clear the annotation field, and a re-execute operation, when executed, is to re-execute the load. A fourth operation, when executed, to determine if the read handler is being executed in response to the re-execute operation. In response to determining the read handler is being re-executed, a before mode operation, when executed, is to set the trap mode to before an instruction mode and a set field operation, when executed, is to set the annotation field. A store handler may also be inserted with similar operations.

As illustrated above, precompiled binaries are capable of being handled in a hardware accelerated STM. Previously, application code with precompiled binaries would be limited, as the precompiled binaries may not benefit from compiler inserted instructions and optimizations. However, by providing different modes of operation, inserting convert mode instructions, and providing strong atomicity between precompiled and newly compiled code, transaction semantics are potentially provided for application code including precompiled binaries. Therefore, the assumption that all code in a transaction is recompiled is potentially removed as a limitation.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A computing device for transactional memory execution, the computing device comprising:
    a cache memory to hold a cache line with a corresponding hardware transaction tracking field; and
    a processing element to:
        encounter, within a transaction, a transactional memory access to the cache line with the corresponding hardware transaction tracking field set to an un-accessed value indicating that the transaction has not previously accessed the cache line during its pendency;
        generate a transactional event in response to an encounter of the transactional memory access;
        determine an address from a storage element of the processing element associated with the transactional event; and
        perform an access barrier operation associated with the address, wherein the transactional memory access includes a transactional read, and wherein the access barrier operation associated with the address is selected from a group consisting of logging of the transactional read, acquisition of a lock for the address, and validation of a previous transactional read.

2. The computing device of claim 1, wherein to generate the transactional event comprises to:
    asynchronously generate an asynchronous trap to handler code in response to a transactional memory access to the cache line with the corresponding hardware transaction tracking field set to an un-accessed value when the processing element is in an implicit mode of transactional execution; and
    set a flag, to be later handled by execution of a synchronous call to handler code, in response to a transactional memory access to the cache line with the corresponding hardware transaction tracking field set to an un-accessed value when the processing element is in an explicit mode of transactional execution.

3. The computing device of claim 1, wherein the processing element is further to execute handler code in response to generation of the transactional event, wherein the handler code comprises read handler code and wherein to execute the handler code comprises to perform the access barrier operation.

4. The computing device of claim 3, wherein to execute the handler code further comprises to:
    determine if there is a livelock associated with the address;
    in response to a determination that there is a livelock associated with the address: (i) set a trap mode to an after mode so the read handler code is executed after the transactional read is performed, (ii) set the hardware transaction tracking field to an un-accessed value, and (iii) re-execute the transactional read;
    determine if the execution of the read handler code is in response to re-execution of the transactional read; and
    in response to a determination that the execution of the read handler code is in response to the re-execution of the transactional read: (i) set the trap mode to a before mode so the read handler code is executed before a subsequent transactional read is performed and (ii) set the hardware transaction tracking field to the accessed value.

5. The computing device of claim 1, wherein the processing element is further to:
    execute handler code in response to generation of the transactional event, wherein the handler code comprises store handler code, and wherein to execute the handler code comprises to perform an access barrier operation associated with the address, wherein the transactional memory access includes a transactional write.

6. The computing device of claim 1, wherein to execute the handler code further comprises to:
    determine if there is a livelock associated with the address;
    in response to a determination that there is a livelock associated with the address: (i) set a trap mode to an after mode so the store handler code is executed after the transactional write is performed, (ii) se the hardware transaction tracking field to an un-accessed value, and (iii) re-execute the transactional store;
    determine the execution of the store handler code is in response to re-execution of the transactional store; and
    in response to a determination that the execution of the store handler code is in response to the re-execution of the transactional store: (i) set the trap mode to a before mode so the store handler code is executed before a subsequent transactional store is performed and (ii) set the hardware transaction tracking field to the accessed value.

7. A method for compiling code, the method comprising:
    detecting, by a computing device, a first function call in application code;
    inserting, by the computing device, a convert implicit mode instruction before the first function call, the convert implicit mode instruction, when executed by an executing computing device, to convert a transactional execution mode of the executing computing device to an implicit mode of transactional execution, the implicit mode of transactional execution including generating asynchronous traps to be handled by handler code upon first transactional memory accesses to data addresses; and
    inserting, by the computing device, a convert explicit mode instruction at a return point from the first function call, the convert explicit mode instruction, when executed by the executing computing device, to convert the transactional execution mode to an explicit mode of transactional execution, the explicit mode of transactional execution including setting flags to be subsequently synchronously handled by handler code upon first transactional memory accesses to data addresses.

8. The method of claim 7, wherein the first function call comprises a call to a legacy code function.

9. The method of claim 7, wherein the first function call comprises a function call to a function capable of being newly compiled, the method further comprising:
- inserting, by the computing device, a second convert explicit instruction at a first point in the first function; and
- inserting, by the computing device, a second convert implicit instruction at a second point of the first function, the second point being after the first point in the first function.

10. The method of claim 9, further comprising:
- inserting, by the computing device, a second function call in the first function to an atomic version of the first function in response to the first function call being inside a transaction; and
- inserting, by the computing device, a third function call in the first function to a strong atomic version of the first function in response to the first function call being outside a transaction.

11. The method of claim 7, wherein:
- to convert the transactional execution mode of the executing computing device to the implicit mode of transactional execution comprises to set a designated mode field of a machine specific register (MSR) of the executing computing device to an implicit mode value; and
- to convert the transactional execution mode to the explicit mode of transactional execution comprises to set the designated mode field of the MSR to an explicit mode value.

12. One or more non-transitory, machine-readable storage media comprising a plurality of instructions that in response to being executed cause a computing device to:
- decode a mode instruction referencing a transactional execution mode;
- update a storage element with an execution mode value to represent the execution mode in response decoding the mode instruction;
- decode a transactional memory access instruction referencing a data address from a transaction, which is to include a group of instructions that updates from are not to be made globally visible until the transaction is committed, wherein the data address is associated with a cache line with a corresponding hardware transaction tracking field;
- update the hardware transaction tracking field associated with the cache line for the data address to an accessed value and asynchronously generate a trap to execute handler code in response to decoding the transactional memory access instruction, the hardware transaction tracking field holding an un-accessed value, and the execution mode value representing the execution mode including an implicit mode of execution.

13. The one or more non-transitory, machine-readable storage media of claim 12, wherein to update the storage element with the execution mode value to represent the execution mode comprises to update a designated mode field of the storage element that is to hold the execution mode value.

14. The one or more non-transitory, machine-readable storage media of claim 12, further comprising a plurality of instructions that in response to being executed cause the computing device to update the hardware transaction tracking field associated with the cache line for the data address to the accessed value and set a tracking flag for subsequent synchronous execution of handler code in response to decoding the transactional memory access instruction, the hardware transaction tracking field holding an un-accessed value, and the execution mode value representing the execution mode including an explicit mode of execution.

15. The one or more non-transitory, machine-readable storage media of claim 14, wherein the mode instruction referencing the transactional execution mode comprises a convert transactional execution mode instruction.

16. The one or more non-transitory, machine-readable storage media of claim 14, further comprising a plurality of instructions that in response to being executed cause the computing device to perform a memory access operation associated with the transactional memory access instruction without setting the tracking flag for subsequent synchronous execution of the handler code in response to decoding the transactional memory access instruction and the hardware transaction tracking field holding an accessed value.

17. The one or more non-transitory, machine-readable storage media of claim 12, further comprising a plurality of instructions that in response to being executed cause the computing device to perform a memory access operation associated with the transactional memory access instruction without asynchronously generating the trap to execute the handler code in response to decoding the transactional memory access instruction and the hardware transaction tracking field holding an accessed value.

18. The one or more non-transitory, machine-readable storage media of claim 12, wherein the transactional memory access instruction comprises a first read operation and the handler code comprises a read handler.

19. The one or more non-transitory, machine-readable storage media of claim 18, wherein to execute the handler code comprises to:
- perform a read barrier operation selected from a group consisting of a logging operation to log the first read operation, a lock acquire operation to acquire a lock for the first read operation, and a store operation to update a transaction descriptor associated with the transaction.

20. The one or more non-transitory, machine-readable storage media of claim 19, wherein to execute the handler code further comprises to:
- determine if a live lock event associated with the memory line is occurring, and in response to determining the live lock event is occurring:
  - set a handler mode to an after mode to execute the read handler code after the read is executed,
  - clear the first bit in the annotation field, and
  - re-execute the read; and
- determine if the read handler code is being executed after the read is re-executed, and in response to the handler code being executed after the read is re-executed:
  - set the handler mode to a default before mode to execute the read handler code before a subsequent read is executed, and set the first bit in the annotation field.

* * * * *